United States Patent [19]
Smith

[11] Patent Number: 4,695,873
[45] Date of Patent: Sep. 22, 1987

[54] HORIZONTAL LINE DATA POSITION AND BURST PHASE ENCODING APPARATUS AND METHOD

[75] Inventor: Terrance Smith, Redwood City, Calif.

[73] Assignee: Ampex Corporation, Redwood City, Calif.

[21] Appl. No.: 872,568

[22] Filed: Jun. 10, 1986

[51] Int. Cl.$^4$ .............................................. H04N 9/44
[52] U.S. Cl. ........................................ 358/13; 358/19; 328/111
[58] Field of Search .................. 358/13, 19, 17, 21 R; 307/265; 328/111

[56] References Cited

U.S. PATENT DOCUMENTS

| | | | |
|---|---|---|---|
| 2,892,882 | 6/1959 | Hughes | 328/111 |
| 3,543,054 | 11/1970 | Schrader | 307/265 |
| 4,272,690 | 6/1981 | Riney et al. | 307/265 |
| 4,339,770 | 7/1982 | Dennison et al. | 358/19 |
| 4,400,717 | 8/1983 | Southworth et al. | 358/13 |
| 4,531,147 | 7/1985 | Kouyama | 358/13 |

FOREIGN PATENT DOCUMENTS

53-623  4/1977  Japan ..................................... 358/13

Primary Examiner—John W. Shepperd
Attorney, Agent, or Firm—Elizabeth E. Strnad; Joel D. Talcott

[57] ABSTRACT

Information related to the beginning of data and the phase of color burst on consecutive horizontal scan lines of a digital color television signal is encoded into a variable width pulse. A first transition of that pulse has a predetermined phase relationship with the beginning of data on each line. A second transition of the variable width pulse is formed by providing a delayed transition with respect to the first transition in a variable delay circuit. The second transition is delayed by different amounts of delay, each corresponding to a particular predetermined color burst phase on that particular line.

19 Claims, 5 Drawing Figures

FIG. 1

FIG_2

FIG.4

FIG_5

HORIZONTAL LINE DATA POSITION AND BURST PHASE ENCODING APPARATUS AND METHOD

BACKGROUND OF THE INVENTION

The invention pertains to the field of processing digitally encoded composite color television signals and more particularly to digitally encoding information related to color burst phase and the beginning of data on each horizontal line.

In systems for processing digitally encoded color television signals it is necessary to know when the first word of digital data defining information pertaining to each horizontal line of video signal will arrive in a stream of data. Each horizontal scan line of video data has associated therewith a group of three synchronizing signals: horizontal blanking, horizontal line synchronization and color burst. The color burst synchronizing signal comprises about eight cycles of the subcarrier signal which is used by the video processing equipment to maintain the local subcarrier oscillator in correct phase relationship with the subcarrier oscillator of the equipment that generates the original video signals. As is well known, the subcarrier signal is utilized to encode the color information into signals which are used by the video processing equipment to reproduce the color content of the original signal.

It is important to know the precise phase relationship of the color burst to the horizontal synchronizing signal at the beginning of each horizontal scan line so that the color signal can be correctly decoded. If this process is not done correctly, then the color of the resulting video signal will not match the color in the original signal.

The synchronizing signal pertaining to each horizontal scan line of video data is a composite of the three synchronizing signals mentioned above. The horizontal line synchronizing signal, further referred to as Hsync, is superimposed upon the horizontal blanking signal. The color burst signal is superimposed upon the horizontal blanking signal following the trailing edge of Hsync.

The phase of the first cycle of burst signal relative to the leading edge of the Hsync differs from line to line. In the NTSC standard television signal system the burst phase relative to the leading edge of Hsync changes by 180 degrees on every consecutive line, such that on every alternative line the burst phase is the same. In the PAL standard signal system the burst phase changes substantially by 90 degrees on consecutive horizontal lines.

In a digital video signal processing system the burst phase must be known for every horizontal scan line since typically such systems do not digitize the original synchronizing signals with the digitized video data. A thusly obtained "abbreviated" form of digital video signal satisfies the synchronization requirements for transmitting or recording digital video signals. Normally new synchronizing signals are generated by the digital video processing devices and reinserted into the digital signal before it is converted back into analog form, as it is necessary for example for display.

In the known devices three or four signals are generated and routed to every location throughout the system where synchronizing signals must be reinserted into the digital video signal. On each such location a decoding circuit is utilized to generate the necessary synchronizing signals from these three or four signals. For example in both the NTSC and PAL systems the following three signals are utilized. The first signal is a binary signal having a frequency of Hsync. It includes a pulse whose leading edge indicates that at some known number of clock cycles later a first data word of the information signal will arrive. The second signal is a clock utilized for sampling the video signal and the third signal is a binary signal which is derived from the first signal. That third signal has one binary state during an entire horizontal line interval where the burst phase is zero degrees and the other binary state for the entire line interval where the burst phase is 180 degrees. Thus the frequency of the third signal is equal to one-half of the frequency of the first signal. In PAL systems an additional fourth signal is utilized that has one binary state for the first two lines in every set of four consecutive horizontal lines and has the opposite binary state in the last two lines in every set of four consecutive lines. The burst phase and the beginning of video data on each horizontal line are decoded from these signals at every location where it is necessary to reinsert synchronizing signals into the digital video.

The disadvantage of this prior art approach is that it increases the complexity of the system by routing these three or four signals to many locations and utilizing a decoding circuit at each such location.

Further if delays occur in the propagation of these signals their timing relationships may become skewed such that an even more complex decoding is required to compensate for the various delays.

The present invention eliminates the above-indicated disadvantages by providing a circuit for encoding the data position and burst phase for each horizontal line at a single location in the system and by transmitting that encoded signal to all locations where such information is needed.

SUMMARY OF THE INVENTION

In accordance with the present invention a variable width pulse is generated into which information related to the beginning of data and color burst phase on each horizontal line is encoded as follows. One transition of that pulse is a reference in time from the occurrence of which a first data word pertaining to a particular horizontal line interval will arrive in a predetermined fixed time interval. A second transition of that variable width pulse is generated in response to a control signal which is delayed with reference to the first transition by a predetermined time interval which varies in accordance with the phase of the color burst signal at the beginning of that particular horizontal line. In one embodiment of the invention, utilized in NTSC systems, two different pulse widths are provided, one for a zero degree phase and the other one for a 180 degree phase of the color burst. In another embodiment of the invention, utilized in PAL systems, four different pulse widths are provided for each set of four consecutive horizontal lines. The beginning of a first data word pertaining to particular horizontal line is referenced to the first transition of the generated pulse, regardless of pulse width.

In the preferred embodiment of the invention the leading edge of the variable width pulse is utilized as the timing reference.

In a particular preferred embodiment utilized in the NTSC system a synchronization signal Hd synchronous with Hsync clocks a predetermined logic level into an input flip-flop. The input flip-flop outputs a logic signal transition which corresponds to a first transition of the variable width pulse. That output signal is clocked through a chain of series flip-flops used for delay and reclocking purposes. Each flip-flop delays the Hd signal by one clock cycle. An Hd/2 signal having one half of the frequency of Hd is clocked through a control flip-flop and used in a gating network to steer one or the other of the outputs of the first two flip-flops in the delay chain to reset the input flip-flop. When the Hd/2 signal is in one state, the output of the first delay flip-flop is applied by the gating circuit to the reset input of the input flip-flop, thereby resetting it after only one clock cycle. The resulting output signal from the input flip-flop is a second logic signal transition of the thusly generated variable width pulse. This has the effect of encoding one phase of the color burst. When the Hd/2 signal is in another logic state the output of the second delay flip-flop is applied to reset the input flip-flop thereby resetting it after two cycles of the clock signal. In this case the resulting variable width pulse is two clock cycles wide.

In an embodiment utilized for PAL systems both the Hd/2 signal and an additional Hd/4 signal are used to control the variable delay. The Hd/4 signal has one half of the frequency of the Hd/2. Because the polarity of the Hd/2 signal changes after every horizontal line and the polarity of the Hd/4 signal after every two horizontal lines, the combinations of the polarities of these two signals are distinct at the beginning of consecutive horizontal lines in each group of four consecutive lines. These two signals, Hd/2 and Hd/4, are sampled at the occurrence of a predetermined edge of the Hd signal to obtain the first transition of the variable of width pulse. The second signal level transition of the variable width pulse is delayed after the first transition by a different predetermined amount of delay for each delay control signal indicating a 90, 180, 270 or 360 degree burst phase on consecutive horizontal lines.

DETAILED DESCRIPTION

To facilitate comparison between the various drawing Figures, like elements will be designated by like reference numerals throughout the drawings.

Figure 1:
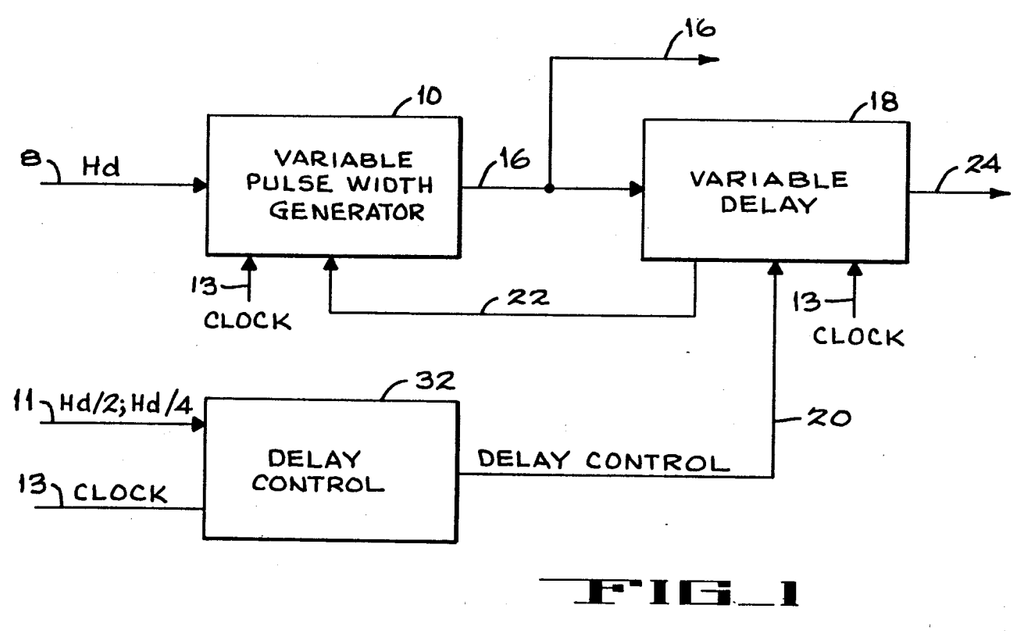
FIG. 1 is a block diagram of a preferred embodiment of the invention.

Referring now to FIG. 1, a variable pulse width forming circuit 10, or shortly pulse width generator 10, receives a synchronizing signal Hd on line 8, which is derived from the horizontal line synchronizing signal Hsync. The signal Hd has the same frequency as Hsync. The signal Hd is frequency divided (not shown in FIG. 1) to obtain a lower frequency synchronizing signal on line 11 and it is phased such that it has a different value for each burst phase at the beginning of each horizontal line period. For example, when utilized in the NTSC system, the signal on line 11 is a phased Hd/2 signal, obtained by frequency dividing the Hd signal and phasing it to correspond to the color burst phase. In the PAL system an Hd/2 and Hd/4 signals are utilized, both being phased to correspond to the color burst phase, as it will be described later in more detail. The signal on line 11 and a clock signal on line 13 are applied to a delay control circuit 32. Circuit 32 provides a delay control signal on line 20 which has distinct digital values corresponding to the above described distinct phases of the signal on line 11.

A variable delay circuit 18 receives the delay control signal on line 20. It also receives a signal transition on line 16 from the variable pulse width generator 10, which transition has a known phase relationship to the occurrence of a selected edge of the synchronizing signal Hd on line 8. For example, the first transition on line 16 is a positive going transition and it occurs simultaneously with the leading edge of the Hd pulse on line 8. The variable delay circuit 18 delays the transition on line 16 by a different time period in response to each respective delay control signal on line 20. Thus, for example, in the NTSC system during consecutive horizontal line periods, the transition on line 16 will be delayed alternatively by two different time periods, each corresponding to a zero or 180 degree burst phase. The thusly delayed transitions are applied via line 22 to a control input of pulse generator 10, which in response thereto applies a second transition in an opposite sense to said first transition, for example a negative going transition, on output line 16. The first transition on line 16 represents the leading edge of an output pulse from the variable pulse width generator, and the second transition represents its trailing edge.

It follows from the foregoing description that the leading edge of the output pulse on line 16 has a known fixed timing relationship to the leading edge of signal Hd, while its width varies in accordance with the delay control signal on line 20. As it has been described previously, the leading edge of the output pulse on line 16 provides a timing reference for determining the beginning of the digitally encoded information signal pertaining to each horizontal line interval. The width of that pulse indicates the phase of the color burst signal at the beginning of that particular horizontal line.

Figure 2:
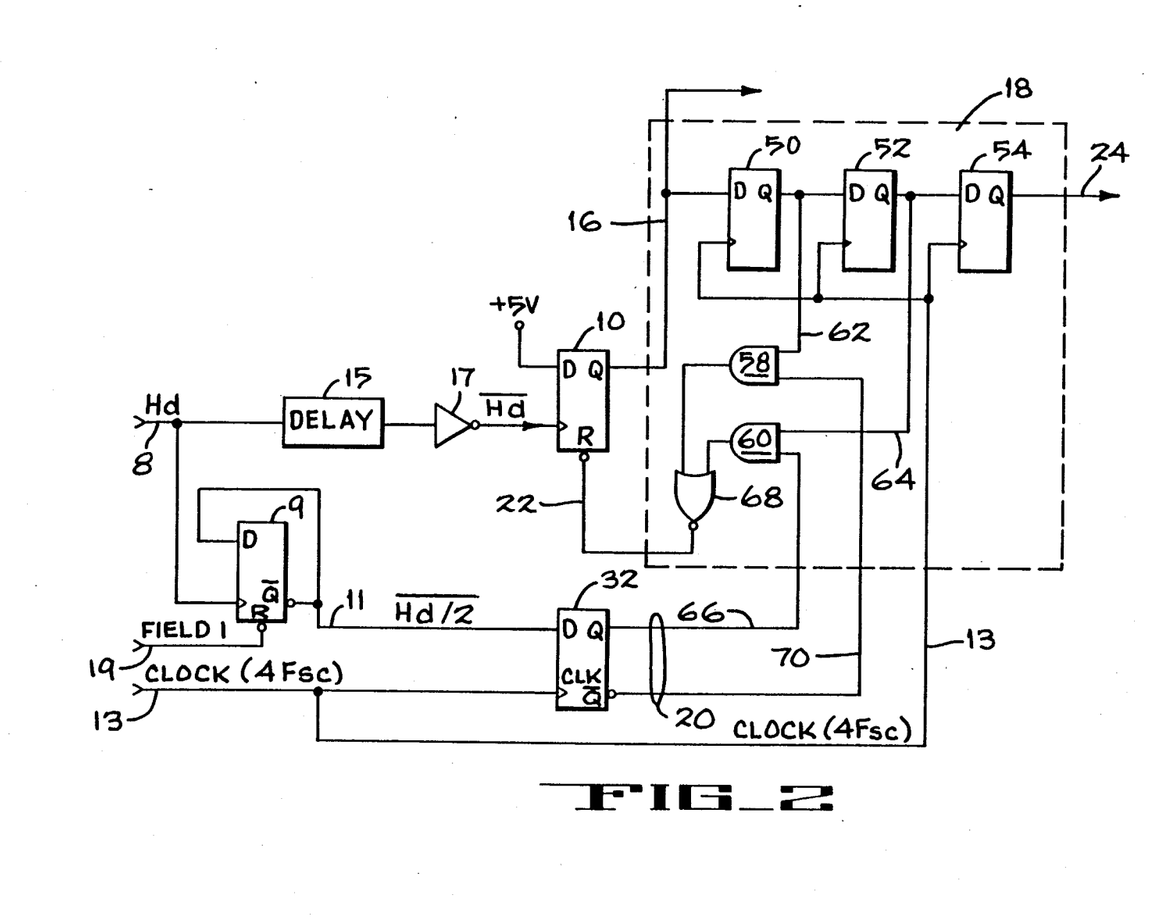
FIG. 2 is a schematic circuit diagram of the preferred embodiment utilized in NTSC systems.
Figure 3:
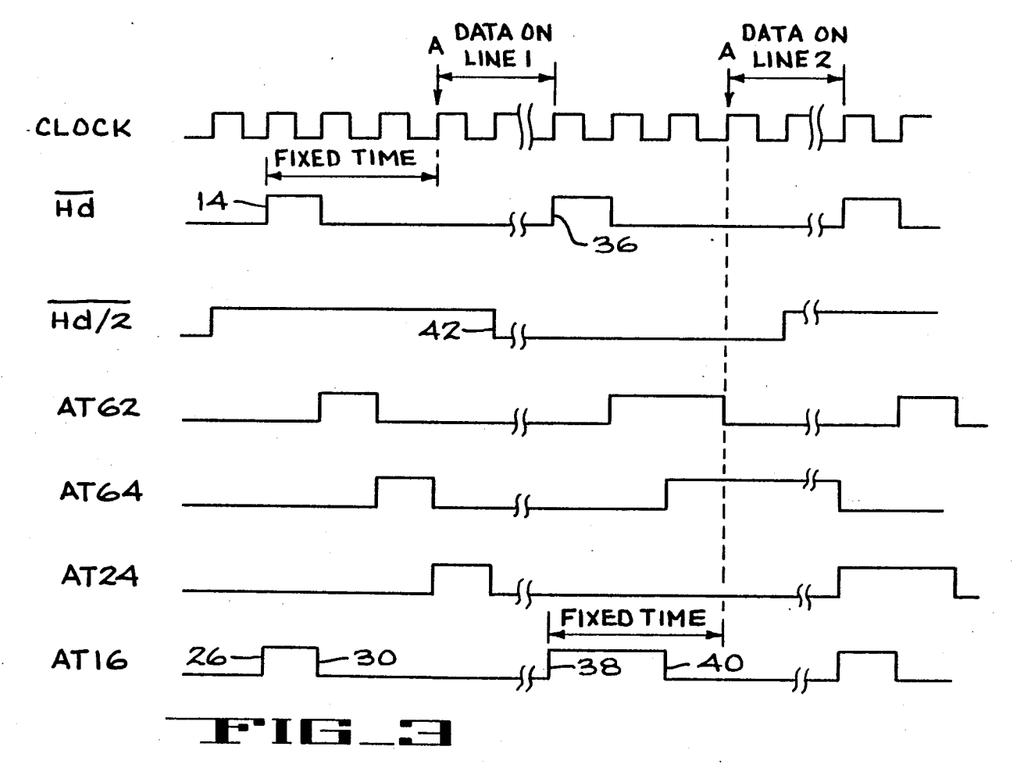
FIG. 3 is a timing diagram depicting the operation of the circuit of FIG. 2.

Referring to FIG. 2 there is shown a detailed circuit diagram corresponding to the above described block diagram of FIG. 1, as being utilized in an NTSC television signal system. The timing relationships of the various signals in this embodiment are shown in FIG. 3. In this embodiment the variable pulse width generator circuit 10 of FIG. 1 is implemented by an input D flip-flop 10. The flip-flop 10 receives at its clock input the previously described synchronizing signal Hd on line 8. (In the embodiment on FIG. 2) the signal Hd has a frequency equal to that of the horizontal line frequency and is comprised of one pulse of arbitrary width for each horizontal scan line. In the preferred embodiment, the leading edge of pulse Hd is delayed by a fixed delay, for example by one clock cycle and inverted prior to being applied to the clock input of flip-flop 10 as it is shown by a delay 15 and inverter 17. The signal Hd is generated by a circuit not relevant to the present invention.

As it is shown in FIG. 3, the leading edge 14 of the signal $\overline{Hd}$ precedes the beginning of a first word of digital data in the corresponding horizontal line, as shown at A, by a predetermined number of clock cycles, for example 3 clock cycles. The D input of flip-flop 10 is permanently connected to a selected voltage level, for example logic 1. Consequently, upon the occurrence of every leading edge of the $\overline{Hd}$ signal there will be a logic 1 clocked in and appearing at the Q output of flip-flop 10 on line 16. The logic transition enters the D input of a first flip-flop 50 of a series flip-flops 50, 52, 54, provided in the variable delay circuit 18, which will be described below in more detail.

The delay control circuit 32 of FIG. 1 is implemented in FIG. 2 by a control flip-flop. It receives at its D input a synchronizing signal $\overline{Hd/2}$ which is applied via line 11. That signal is obtained by frequency dividing by two the signal Hd in a frequency divider 9.

The frequency divider 9 is implemented by a D flip-flop having its clock input connected to the input line 8. The $\overline{Q}$ output of flip-flop 9 is connected to D input of flip-flop 32 to obtain the frequency division by 2 in a known manner. To assure proper phasing of the $\overline{Hd/2}$ signal on line 11 with the line-to-line color burst phase, a reset input of the flip-flop 9 receives a reset signal, for example from a horizontal field indicator (not shown) which signal indicates the occurrence of one particular video field of the processed composite video signal, for example field 1, in a well known manner. The flip-flop 9 is preset to have a predetermined output signal level on line 11, for example a high level, at the occurrence of each field 1. That signal corresponds for example to a zero degree burst phase at the beginning of each field 1, thereby assuring correct phasing of the resulting phased Hd/2 signal to the color burst phase.

It follows from the foregoing description that the signal Hd/2 has one logic state when the color burst phase is zero degrees and another logic state when it is 180 degrees at the beginning of each horizontal line. The control flip-flop 32 receives at its clock input a clock signal on line 13. That clock signal is synchronous with the color subcarrier of the color television signal being processed and in the the embodiment of FIG. 2 it has a frequency 4Fsc equal to four times the subcarrier frequency Fsc. The 4Fsc clock is utilized to sample the video signal for encoding into the digital data. That clock signal is obtained from a system voltage controlled oscillator which is generator-locked to the color burst in a well known manner. Alternatively, a clock signal having a different even multiple of the subcarrier signal frequency may be selected, such as 2Fsc, 6Fsc, etc. The timing relationships of the respective signals 4Fsc, Hd, Hd/2, and of other signals utilized in the circuit of FIG. 2 are shown in the timing diagram of FIG. 3.

The control flip-flop 32 provides a 4Fsc output signal at its Q output on line 66 which is in phase with the signal Hd/2 and an inverted signal at its $\overline{Q}$ output on line 70. The signals on line 66, 70 correspond to the delay control signal on line 20 of FIG. 1.

The 4Fsc clock signal on line 13 is also applied to the respective clock inputs of series flip-flops 50, 52 and 54. Each of these series flip-flops delays the pulse on line 16 by one 4Fsc clock cycle. The variable delay circuit 18 further has two AND gates 58, 60 and a NOR gate 68. AND gate 58 receives at one input the output signal on line 62 from the first series flip-flop 50. At its second input gate 58 receives via line 70 the $\overline{Q}$ output signal of the control flip-flop 32. AND gate 60 receives at one input the output signal on line 64 from the second series flip-flop 52 and at its second input the Q output signal from the control flip-flop 32 via line 66. The respective output signals from both AND gates 58, 60 are applied each to a different input of the NOR gate 68.

The respective outputs 62 and 64 from the series flip-flops 50, 52 cause the signal transition on line 16, corresponding to the trailing edge of the output pulse, to be delayed by one cycle of 4Fsc and two cycles of 4Fsc, respectively. When the $\overline{Hd/2}$ signal on line 11 is high, the signal on line 66 is also high and AND gate 60 gates the transition on line 64 through to the NOR gate 68. Gate 68 passes the signal to the reset input of the input flip-flop 10 thereby resetting it and forming the trailing edge of the output pulse on line 16. The width of the resulting output pulse is thus equal to two cycles of the 4Fsc signal, corresponding to a particular value of encoded burst phase, for example 180 degrees. When the $\overline{Hd/2}$ signal is low, the signal on line 70 is high and AND gate 58 passes the transition on line 62 to the reset input of input flip-flop 10 through NOR gate 68. This forms the trailing edge of the output pulse on line 16. The width of the resulting output pulse is thus equal to one cycle of the 4Fsc signal, for example corresponding to an encoded burst phase of zero degrees. Although the thusly formed output pulse may be obtained from line 16, it is preferred to be taken at the output of the last series flip-flop 54 because this output is synchronous with the 4Fsc clock whereas the pulse on line 16 as well as on line 62 or 64 may be skewed.

As it is seen from FIG. 3, regardless of the pulse width on line 16, the leading edge 26, 38 of each pulse has a constant predetermined phase relationship to the beginning A of the data on each horizontal line. In the embodiment of FIG. 2 that constant phase is 3 clock cycles.

Figure 4:
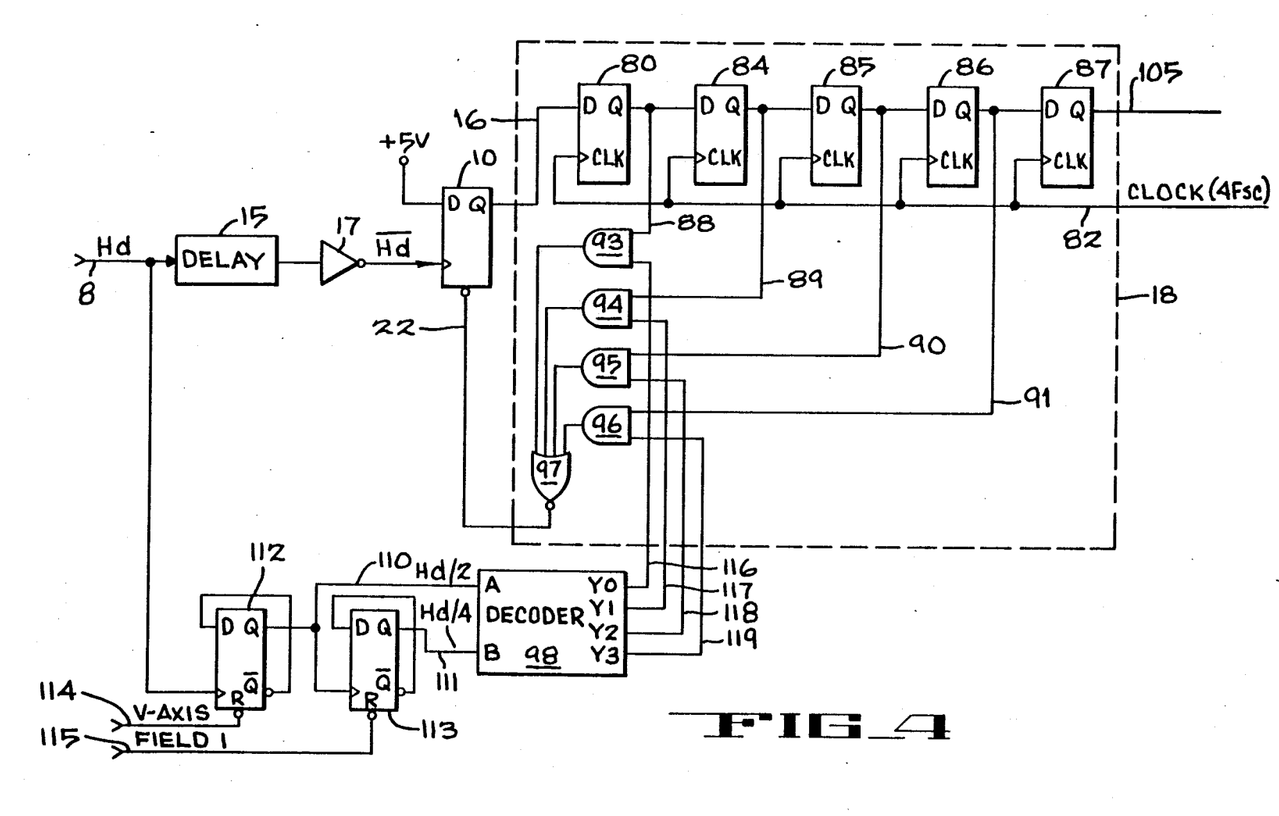
FIG. 4 is a schematic circuit diagram of the preferred embodiment utilized in PAL systems.
Figure 5:
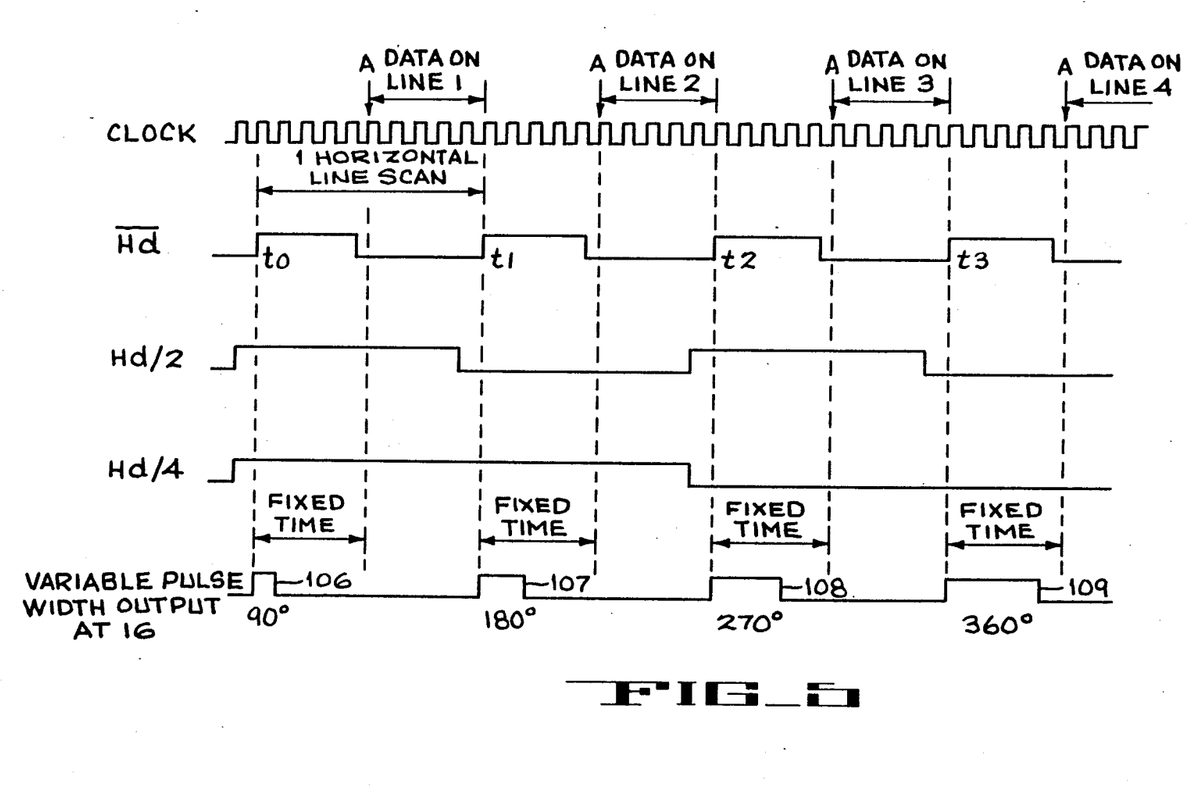
FIG. 5 is a timing diagram showing operation of the circuit of FIG. 4.

Referring to FIGS. 4 and 5, there are shown respectively a circuit diagram and timing diagram of an embodiment of the invention utilized in PAL systems. The circuit of FIG. 4 is similar to that of FIG. 2 with the following differences. In FIG. 4 the leading edge of the $\overline{Hd}$ signal clocks a logic one into the input flip-flop 10, as in the embodiment of FIG. 2. This sets the Q output line 16 and a logic one is clocked into the first series flip-flop 80 on the next upward transition of the 4Fsc clock on line 82. This logic one appears on the Q output on the flip-flop 80 when it is clocked in and propagates down the chain of five series delay flip-flops 84 through 87 appearing at the Q output of each one approximately one cycle of the 4Fsc clock after the occurrence of the logic one at the output of the preceding flip-flop in the chain. Each of the Q outputs 88 through 91 is coupled to one input of one of four AND gates 93 through 96 respectively. The other input of each of the AND gates 93 through 96 respectively is coupled to one of the outputs of a decoder 98. The decoder 98 has its binary input A coupled to receive via line 110 the previously described Hd/2 signal and via line 111 an Hd/4 signal. The respective signals Hd/2 and Hd/4 are obtained for example as follows. With further reference to FIG. 4, two series connected frequency dividers by two 112, 113 are utilized, each divider being implemented by a D type flip-flop in a similar manner as flip-flop 9 of FIG. 2. The $\overline{Q}$ output of each flip-flop 112, 113 is connected to its D input. The clock input of the first divider 112 receives the previously described Hd signal on line 8. The Q output of flip-flop 112 is connected via line 110 to A input of decoder 98 as well as to the clock input of flip-flop 113. The Q output of flip-flop 113 is connected via line 111 to the B input of decoder 98. Thus, the output signal on line 110 from the first series divider by two 112 corresponds to the previously described Hd/2 signal having one-half of the frequency of the Hd signal.

The output signal from the second series divider by two 113 has a frequency corresponding to one-fourth of the frequency of Hd on line 8 and is designated Hd/4.

To assure that the respective output signals from each flip-flop 112, 113 will always have the same predetermined binary value for a predetermined phase of the color burst signal, the Q output of each flip-flop is preset to a selected value, for example a logic 1, upon receipt of a reset signal on lines 114, 115. The reset signal on line 115 is the previously described signal indicating the beginning of each video field 1. Because in the PAL system the burst phase repeats after four subsequent video fields, the reset signal on line 115 will have a frequency equal to one-quarter of video field frequency. The other reset signal on line 114 is applied at one-half horizontal line interval. It may be obtained for example from a well known chroma decoding device.

As it is seen from FIG. 5, at the occurrence of each leading edge of the signal $\overline{Hd}$, that is at times t0 to t3 the combined status of the Hd/2 and Hd/4 signals yield a distinct binary number. The decoder 98 decodes the binary number represented by the signals on the A and B inputs and activates (active high) the one of its four outputs Y0 through Y3 which corresponds to the then current binary number on the A and B inputs. The resultant sequential activations of the outputs Y0 to Y3 gate via lines 116 to 119 the logic ones appearing in sequence on the outputs of the flip-flops 80 and 84 to 86 via one of the AND gates 93 to 96 and the NOR gate 97 to reset the input flip-flop 10 and establish the position in time and pulse width of the output signal on line 16. As in the embodiment on FIG. 2, the output may be taken from Q output line 16 or from the Q output line 105 of the flip-flop 87. The resulting output signal on line 16 is shown in FIG. 5. Because it may be slightly skewed, with respect to the clock signal 4Fsc, it is preferable to take the output signal on line 105 which is a reclocked version of the signal on line 16 delayed by 5 clock cycles and therefore synchronous with the Fsc clock signal.

FIG. 5 shows how the Hd/2 and Hd/4 signals are decoded to define the four different pulse widths for the variable width output pulse. At each low to high transition of the $\overline{Hd}$ signal, the logic states of the decoder 98 input signals are decoded and the corresponding one of the outputs is activated. Times t0 through t3 correspond to the leading edges of the $\overline{Hd}$ pulses at the beginning of PAL horizontal scan lines 1 through 4. It is seen from the logic states of the signals Hd/2, Hd/4 at times t0 to t3 that they define four distinct binary numbers. Time t0 corresponds to Y0 output of decoder 98 being active high and AND gate 93 being enabled to pass the logic one on line 88 through the NOR gate 97 to reset flip-flop 10 and form the trailing edge 106 at output 16. This forms an output signal on line 16 which has a one clock cycle pulse width. Likewise at times t1 AND gate 94 is enabled and the trailing edge 107 thereby forms an output pulse width of two clock cycles. Similarly, the trailing edge 108 is formed by enabling gate 95 at time t2, resulting in a pulse width of three clock cycles. Trailing edge 109 forms a pulse width of four clock cycles obtained by activating gate 96 at time t3. As it is shown in FIG. 5, the one clock cycle pulse width corresponds to a 90 degree burst phase; a pulse width of two clock cycles to a 180 degree burst phase; of three clock cycles to a 270 degree burst phase and of four clock cycles to a 360 or zero degree burst phase.

As it is seen from FIG. 5, the leading edge of each output pulse at 16 has a fixed timing relationship to the beginning A of data on each particular horizontal line, regardless of pulse width.

Although the invention has been described in terms of the various embodiments detailed herein, those skilled in the art will appreciate other embodiments which will accomplish the same result in substantially the same manner. All such embodiments are intended to be included within the scope of the claims appended hereto.

What is claimed is:

1. In a system for processing a digitally encoded composite color television signal comprising a horizontal line synchronizing signal and a color burst signal having predetermined phase relationships to said horizontal line synchronizing signal which differ on consecutive horizontal lines of said color television signal, apparatus for encoding information related to a beginning of data pertaining to each horizontal line and to a phase of said color burst signal on consecutive lines of said digitally encoded signal, said apparatus comprising:

variable width pulse forming means, coupled to receive a first synchronizing signal having a predetermined phase relationship with said horizontal line synchronizing signal and a frequency corresponding thereto, for providing a variable width output pulse having a first transition of a predetermined phase relationship with said first signal;

delay control means, coupled to receive a signal indicating said predetermined phase relationship of said color burst signal at a beginning of each horizontal line, for providing respective delay control signals for respective values of said phase relationship; and variable delay means coupled to receive said delay control signals, for applying responsively a delayed control signal to a control input of said variable width pulse forming means, said variable width pulse forming means coupled to provide a second transition of said variable width output pulse in response to said delayed control signal.

2. The system of claim 1 wherein said delayed control signal is provided by delaying said first transition by a different amount of delay in response to each said respective delay control signal.

3. In a system for processing a digitally encoded composite color television signal comprising a horizontal line synchronizing signal and a color burst signal having predetermined phase relationships to said horizontal line synchronizing signal which differ on consecutive horizontal lines of said color television signal, apparatus for encoding information related to a beginning of data pertaining to each horizontal line and to a phase of said color burst signal on consecutive lines of said digitally encoded signal, said apparatus comprising:

variable width pulse forming means coupled to receive a first synchronizing signal having a predetermined phase relationship with said horizontal line synchronizing signal and a frequency corresponding thereto, for providing a variable width output pulse having a first transition of a predetermined phase relationship with said first signal;

delay control means, coupled to receive a signal indicating said predetermined phase relationship of said color burst signal at a beginning of each horizontal line, for providing respective delay control signals for respective values of said phase relationship; and variable delay means, coupled to receive said first transition of said variable width output pulse provided by said pulse forming means, for delaying said first transition by a different amount of delay in response to each said respective delay control signal and applying said delayed first transition to a control input of said pulse forming means to obtain a second transition of said variable width output pulse provided thereby.

4. The system of claim 3 wherein said variable delay means comprises at least two series delay means, each for delaying said first transition by a predetermined number of clock cycles.

5. The system of claim 4 wherein said variable delay means further comprises gate means, said gate means having respective first inputs, each coupled to receive one said delay control signal provided by said delay control means and respective second inputs, each coupled to an output of one said series delay means, for providing respective output signals each delayed by a different number of clock cycles in response to each said delay control signal.

6. The system of claim 3 wherein said apparatus is coupled to receive a clock signal having a frequency equal to an even multiple number of a frequency of said color burst signal.

7. The system of claim 3 wherein said respective delay control signals are provided by said delay control means in a sequence corresponding to that of said predetermined different phase relationships of said color burst signal on consecutive horizontal lines.

8. The system of claim 3 wherein said signal indicating said predetermined phase relationship of said color burst signal is a second synchronizing signal having a predetermined phase relationship with said first synchronizing signal and having one-half of the frequency of said horizontal line synchronizing signal.

9. The system of claim 8 wherein said first synchronizing signal applied to said variable width pulse forming means is delayed with respect to said second synchronizing signal.

10. The system of claim 3 wherein said signal indicating said predetermined phase relationship of said color burst signal comprises a second and a third synchronizing signal, each signal having a predetermined phase relationship with said first synchronizing signal, said second signal having one-half of the frequency and said third signal having one-quarter of the frequency of said horizontal line synchronizing signal.

11. The system of claim 10 wherein said first synchronizing signal applied to said variable width pulse forming means is delayed with respect to both said second and third synchronizing signals.

12. The system of claim 3 wherein said variable pulse width forming means comprises an input flip-flop having a D-input coupled to a predetermined logic level, a clock input coupled to receive said first synchronizing signal and a reset input coupled to an output of said variable delay means.

13. The system of claim 8 wherein said delay control means comprises a control flip-flop having an input coupled to receive said second synchronizing signal, a clock input coupled to receive a clock signal having an even multiple frequency of said color burst signal and having a first output providing a non-inverted first delay control signal and a second output providing an inverted second delay control signal.

14. The system of claim 10 wherein said delay control means comprises a decoding means having a first and a second input, each coupled to receive one of said second and third synchronizing signals, said decoding means coupled to provide four different output signals, each corresponding to a distinct combination of logic signal levels of said input signals at the occurrence of a selected edge of said first synchronizing signal.

15. In a system for processing a digitally encoded composite color television signal, comprising a horizontal line synchronizing signal and a color burst signal having predetermined phase relationships to said horizontal line synchronizing signal which differ on consecutive horizontal lines of said color television signal, apparatus for encoding information related to a beginning of data pertaining to each horizontal line and to a phase of said color burst signal on consecutive lines of said digitally encoded signal, said apparatus comprising:

variable width pulse forming means coupled to receive a first synchronizing signal having a predetermined phase relationship with said horizontal line synchronizing signal and a frequency corresponding thereto, for providing a variable width output pulse having a first transition of a predetermined phase relationship with said first signal;

delay control means, coupled to receive a signal indicating said predetermined phase relationship of said color burst signal at a beginning of each horizontal line, for providing respective delay control signals for respective values of said phase relationship; and variable delay means, coupled to receive said first transition of said variable width output pulse provided by said pulse forming means, said variable delay means comprises at least two series delay means, each for delaying said first transition by a different amount of delay in response to each said respective delay control signal, and gate means having respective first inputs, each coupled to receive one said delay control signal provided by said delay control means and respective second inputs, each coupled to an output of one said series delay means, for providing respective output signals each delayed by a different amount of delay in response to each said delay control signal and for applying said delayed output signals to a control input of said pulse forming means to obtain a second transition of said variable width output pulse provided thereby.

16. The system of claim 15 wherein said variable width pulse forming means comprises an input flip-flop having a D input coupled to a predetermined logic level, a clock input coupled to receive said first synchronizing signal and a reset input coupled to an output of said variable delay means, and wherein said delay control means comprises a control flip-flop having an input coupled to receive said second synchronizing signal, a clock input coupled to receive a clock signal having an even multiple frequency of said color burst signal and having a first output providing a non-inverted first delay control signal and a second output providing an inverted second delay control signal.

17. In a system for processing a digitally encoded composite NTSC color television signal comprising a horizontal line synchronizing signal and a color burst signal having a zero degree and a 180 degree phase relationship to said horizontal line synchronizing signal at the beginning of consecutive horizontal lines of said color television signal, apparatus for encoding information related to a beginning of data pertaining to each horizontal line and to said phase of said color burst signal on consecutive lines of said digitally encoded signal, said apparatus comprising:

variable width pulse forming means, coupled to receive a first synchronizing signal having a predetermined phase relationship with and a frequency corresponding to said horizontal line synchronizing signal, for providing a variable width output pulse having a first transition of a predetermined phase relationship with said first synchronizing signal;

delay control means, coupled to receive a second synchronizing signal having a first logic value indicating said zero degree phase, and a second logic value indicating said 180 degree phase, at the beginning of said consecutive horizontal lines, for providing a first and a second delay control signal, respectively, in response to each said value of said second synchronizing signal; and variable delay means coupled to receive said first transition of said variable width output pulse provided by said pulse forming means, said variable delay means comprises two series delay means, each for delaying said first transition by a different amount of delay in response to each said respective delay control signal, and gate means having respective first inputs, each coupled to receive one said delay control signal provided by said delay control means and respective second inputs, each coupled to an output of one said series delay means, for providing respective output signals each delayed by a different amount of delay in response to each said delay control signal and applying said delayed output signals to a control input of said pulse forming means to obtain a second transition of said variable width output pulse provided thereby.

18. In a system for processing a digitally encoded composite PAL color television signal comprising a horizontal line synchronizing signal and a color burst signal having predetermined phase relationships to said horizontal line synchronizing signal which differ on consecutive horizontal lines within each group of four consecutive lines of said color television signal, apparatus for encoding information related to a beginning of data pertaining to each horizontal line and to a phase of said color burst signal on consecutive lines of said digitally encoded signal, said apparatus comprising:

variable width pulse forming means, coupled to receive a first synchronizing signal having a predetermined phase relationship with said horizontal line synchronizing signal and a frequency corresponding thereto, for providing a variable width output pulse having a first transition of a predetermined phase relationship with said first synchronizing signal;

delay control means comprising a decoding means, coupled to receive a second and a third synchronizing signal, said second synchronizing signal having one-half of the frequency and said third synchronizing signal having one-quarter of the frequency of said horizontal line synchronizing signal, said decoding means for providing four different delay control signals, each corresponding to a distinct combination of logic signal levels of said input signals at the occurrence of a selected edge of said first synchronization signal; and variable delay means coupled to receive said first transition of said variable width output pulse provided by said pulse forming means, said variable delay means comprises four series delay means, each for delaying said first transition by a different amount of delay in response to each said respective delay control signal and gate means having respective first inputs, each coupled to receive one said delay control signal and respective second inputs, each coupled to an output of one said series delay means, for providing respective output signals each delayed by a different amount of delay in response to each said delay control signal and to apply said delayed output signals to a control input of said pulse forming means to obtain a second transition of said variable width output pulse provided thereby.

19. A method of encoding information related to a beginning of data pertaining to each horizontal line and to a phase of a color burst signal of a digitally encoded composite color television signal, said composite signal comprising a horizontal line synchronizing signal and a color burst signal having a known predetermined phase relationship to said horizontal line synchronizing signal on consecutive horizontal lines of said color television signal, comprising the steps of:

providing a variable width pulse having a first transition having a predetermined phase relationship with said horizontal line synchronizing signal;

providing respective delay control signals, each corresponding to one said known predetermined phase relationship of said color burst signal at a beginning of each consecutive horizontal line; and delaying said first transition by a predetermined different amount of delay in response to each respective delay control signal, to obtain a second transition of said variable width pulse.

* * * * *